(12) United States Patent
Song (10) Patent No.: US 11,237,434 B2
(45) Date of Patent: Feb. 1, 2022

(54) DISPLAY PANEL AND DISPLAY TERMINAL

(71) Applicants: Chongqing HKC Optoelectronics Technology Co., Ltd., Chongqing (CN); HKC Corporation Limited, Shenzhen (CN)

(72) Inventor: Zhenli Song, Chongqing (CN)

(73) Assignees: Chongqing HHC Optoelectronics Technology Co., Ltd, Chongqing (CN); HKC Corporation Limited, Shenzhen (CN)

(*) Notice: Subject to any disclaimer, the term of this patent is extended or adjusted under 35 U.S.C. 154(b) by 0 days.

(21) Appl. No.: 17/044,211

(22) PCT Filed: Nov. 14, 2018

(86) PCT No.: PCT/CN2018/115293
§ 371 (c)(1),
(2) Date: Sep. 30, 2020

(87) PCT Pub. No.: WO2020/062474
PCT Pub. Date: Apr. 2, 2020

(65) Prior Publication Data
US 2021/0055583 A1 Feb. 25, 2021

(30) Foreign Application Priority Data
Sep. 30, 2018 (CN) .......................... 201821615023.3

(51) Int. Cl.
*G02F 1/1339* (2006.01)
*G02F 1/1362* (2006.01)
*G02F 1/1368* (2006.01)

(52) U.S. Cl.
CPC .......... *G02F 1/1339* (2013.01); *G02F 1/1368* (2013.01); *G02F 1/136209* (2013.01)

(58) Field of Classification Search
CPC ................. G02F 1/1368; G02F 1/1339; G02F 1/136209; G02F 1/1333; G02F 1/1335; G02F 1/136286
See application file for complete search history.

(56) References Cited

U.S. PATENT DOCUMENTS 5,859,683 A * 1/1999 Tagusa .............. G02F 1/136227
349/138
7,355,669 B2 * 4/2008 Onda .................... G02F 1/1339
349/149

(Continued)

FOREIGN PATENT DOCUMENTS

CN 103293774 A 9/2013
CN 107229152 A 10/2017

(Continued)

OTHER PUBLICATIONS

International Search Report dated Jun. 14, 2019 issued in corresponding International Application No. PCT/CN2018/115293, filed Nov. 14, 2018, 2 pages.

*Primary Examiner* — Hoan C Nguyen
(74) *Attorney, Agent, or Firm* — Christensen O'Connor Johnson Kindness PLLC (57) ABSTRACT

A display panel includes a display area and a non-display area surrounding the display area; the display panel includes: a first substrate; a second substrate disposed opposite and spaced apart from the first substrate; a liquid crystal layer disposed between the first substrate and the second substrate; a seal (240) disposed between the first substrate (210) and the second substrate (220) and located in the non-display area (22); and a multi-function layer (250) disposed on the first substrate (210) and located in the non-display area (22); the multi-function layer (250) includes a support portion (252) embedded in the seal (240) and is in surface contact with the second substrate (220) so (Continued)

as to effect an electrical connection between the first substrate (210) and the second substrate (220).

16 Claims, 4 Drawing Sheets

(56) References Cited

U.S. PATENT DOCUMENTS

| | | | | |
|---|---|---|---|---|
| 7,847,311 | B2* | 12/2010 | Kim | H01L 27/3276 |
| | | | | 257/99 |
| 2007/0120152 | A1* | 5/2007 | Chang | G02F 1/133345 |
| | | | | 257/270 |
| 2008/0088787 | A1* | 4/2008 | Yim | G02F 1/1362 |
| | | | | 349/156 |
| 2012/0168790 | A1* | 7/2012 | Tseng | G02F 1/13458 |
| | | | | 257/91 |
| 2014/0092357 | A1* | 4/2014 | Chen | G02F 1/1333 |
| | | | | 349/155 |
| 2015/0103298 | A1* | 4/2015 | Lee | G02F 1/133512 |
| | | | | 349/123 |

FOREIGN PATENT DOCUMENTS

| | | | |
|---|---|---|---|
| CN | 108196389 A | | 6/2018 |
| JP | 2013003305 A | | 1/2013 |
| KR | 20110067261 | * | 6/2011 |

* cited by examiner

FIG. 4

DISPLAY PANEL AND DISPLAY TERMINAL

TECHNICAL FIELD

The present disclosure relates to the technical field of display panels, in particular relates to a display panel and a display terminal.

BACKGROUND

The display panel is generally formed by aligning upper and lower two substrates (i.e., an array substrate) with a CF plate (color filter substrate). The periphery of the aligned upper and lower substrates is bonded with seal to prevent liquid crystal from overflowing and moisture intrusion, as well as maintain the cell thickness around the liquid crystal cell. The uniformity of the peripheral box thickness of the conventional display panel is poor, thereby affecting the display effect of the panel.

SUMMARY

Accordingly, it is necessary to provide a display panel that can improve the display uniformity of each of the sub-pixels to address the foregoing technical problems.

A display panel includes a display area and a non-display area surrounding the display area, the display panel includes:

a first substrate;

a second substrate disposed opposite and spaced apart from the first substrate;

a seal disposed between the first substrate and the second substrate and located in the non-display area; and a multi-function layer disposed on the first substrate and located in the non-display area, the multi-function layer includes a support portion embedded in the seal and is in surface contact with the second substrate, and the multi-function layer is a light blocking layer.

In one of the embodiments, the multi-function layer includes a support layer formed on the first substrate, the support layer includes the support portion, the support layer defining a first via located above a common electrode of the first substrate; and a conductive layer formed on the support layer, a region of the conductive layer located on the support portion being electrically connected to the second substrate, and the conductive layer being also electrically connected to the first substrate through the first via.

In one of the embodiments, a pore size of the first via is 5 μm to 30 μm.

In one of the embodiments, the first substrate includes:
an underlay;
a Thin Film Transistor (TFT) layer formed on the underlay and includes a common electrode;
a first passivation layer formed on the TFT layer and away from the underlay; and
a pixel electrode formed on the first passivation layer and located in the display area;
the conductive layer is connected to the common electrode of the first substrate through the first via; and the pixel electrode and the common electrode have the same thickness.

In one of the embodiments, the first substrate further includes a support member formed on a gate of the TFT layer; the support portion and the support member have the same structure and are obtained in the same preparation process; and both the support member and the support layer are made of a shading material.

In one of the embodiments, both the support member and the support layer are black matrixes.

In one of the embodiments, the first passivation layer is a PV insulating material.

In one of the embodiments, both the conductive layer and the pixel electrode are made of indium tin oxide.

In one of the embodiments, the number of the support portions is plural, the plurality of the support portions are disposed in the non-display area and spaced apart from each other, ends of each of the support portions proximately to the second substrate are located in a first plane; the first plane is parallel to a surface of the second substrate.

In one of the embodiments, a total area of the support portion in contact with the second substrate is 1% to 5% of the non-display area.

In one of the embodiments, the support portion includes a first support portion formed in a first region located above the common electrode of the first substrate; and a second support portion located in a second region of the first substrate.

In one of the embodiments, the support portions are regularly disposed in the non-display area.

In one of the embodiments, a shape of a cross-section of the support portion is a symmetrical pattern.

In one of the embodiments, the shape of the cross-section of the support portion is circular, elliptical or rectangular.

In one of the embodiments, the display panel further includes a liquid crystal layer formed between the first substrate and the second substrate.

In one of the embodiments, the display panel is a Liquid Crystal Display (LCD) panel, an Organic Light-Emitting Diode (OLED) display panel, or a Quantum Dot Light-Emitting Diode (QLED) display panel.

A display panel includes a display area and a non-display area surrounding the display area, the display panel includes:

a first substrate;

a second substrate disposed opposite and spaced apart from the first substrate;

a liquid crystal layer disposed between the first substrate and the second substrate;

a seal disposed between the first substrate and the second substrate and located in the non-display area; the seal surrounds the liquid crystal layer; and a multi-function layer disposed on the first substrate and located in the non-display area, the multi-function layer includes a support portion embedded in the seal and is in surface contact with the second substrate so as to effect an electrical connection between the first substrate and the second substrate;

the multi-function layer includes a support layer formed on the first substrate, the support layer includes the support portion, the support layer defines a first via located above a common electrode of the first substrate; and a conductive layer formed on the support layer, a region of the conductive layer located on the support portion is electrically connected to the second substrate, and the conductive layer is also electrically connected to the first substrate through the first via; the support layer is a shading layer; a total area of the support portion in contact with the second substrate is 1% to 5% of the non-display area.

In one of the embodiments, the first substrate includes:
an underlay;
a TFT layer formed on the underlay and includes the common electrode;

a first passivation layer formed on the TFT layer and away from the underlay; and a pixel electrode formed on the first passivation layer and located in the display area;

the conductive layer is connected to the common electrode of the first substrate through the first via; and the pixel electrode and the common electrode have the same thickness;

the first substrate further includes a support member formed on a gate of the TFT layer, the support portion and the support member have the same structure and are obtained in the same preparation process, and both the support member and the support layer are made of a shading material.

A display terminal, includes a terminal body and a display panel disposed thereon the terminal body; the display panel includes a display area and a non-display area surrounding the display area, the display panel further includes:

a first substrate;

a second substrate disposed opposite and spaced apart from the first substrate;

a seal disposed between the first substrate and the second substrate and located in the non-display area; and a multi-function layer disposed on the first substrate and located in the non-display area, the multi-function layer includes a support portion embedded in the seal and is in surface contact with the second substrate, and the multi-function layer is a light blocking layer.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts

DETAILED DESCRIPTION OF THE EMBODIMENTS

The present disclosure will be described in details in combination with the accompanying drawings and embodiments such that the purpose, technical solution and advantages of the present disclosure will be more apparent. It should be understood that the particular embodiments are described for the purpose of illustrating as opposed to restricting the present disclosure.

As used herein, spatial or directional terms, such as "left", "right", "inner", "outer", "above", "below", "top", "bottom", and the like, are understood to encompass various alternative orientations and, accordingly, such terms are not to be considered as limiting. It will be understood that when an element is referred to as being "formed on another element", it can be directly connected or coupled to the other element or intervening elements may be present. In contrast, if an element is referred to as being "directly connected" or "directly coupled" to another element, there are no intervening elements present.

Figure 1:
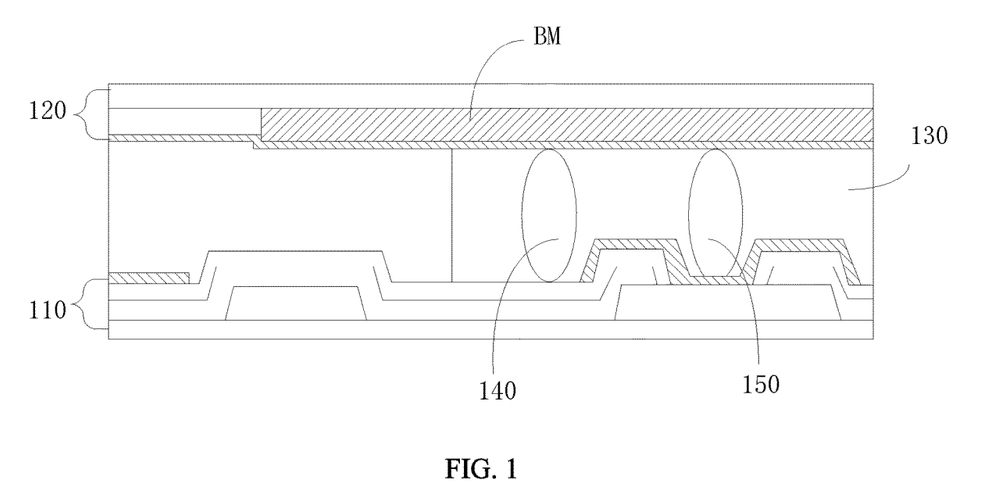
FIG. 1 is a schematic diagram of a conventional display panel.

Liquid crystal display (LCD) has many advantages, such as thin body, power saving, no radiation, etc., and has been widely used. For example, display panels are increasingly used on display terminals such as mobile phones, personal digital assistants (PAD), digital cameras, computer screens, or notebook computer screens. A conventional display panel is generally formed by aligning upper and lower two substrates, i.e., a first substrate (an array substrate) 110 and a second substrate (a CF substrate) 120, as shown in FIG. 1. The periphery of the aligned upper and lower substrates is bonded with seal 130 to prevent liquid crystal from overflowing and moisture intrusion, as well as maintain the cell thickness around the liquid crystal cell. In order to make the box thickness of the display panel formed by the bonded upper and lower substrates to be uniform and to make the common electrodes of the upper and lower substrates electrically conductive, silicon balls 140 and gold balls 150 are generally mixed in the region of the seal 130. The silicon balls 140 serve to support the peripheral box thickness in the panel peripheral structure, and the gold balls 150 serve to conduct the upper and lower substrates. It has been found by the inventor that since the spherical silicon balls 140 and the gold balls 150 are independent of the TFT first substrate 110 and the second substrate 120 and are doped in the seal for bonding the first substrate 110 and the second substrate 120, the contact area with the upper and lower substrates is small and extremely unstable, and it is difficult to control the peripheral box thickness, resulting in uneven peripheral thickness of the display panel, thereby affecting the display effect of the panel.

To address the above problem, a display panel is provided according to an embodiment of the present disclosure. The display panel may be an LCD display panel, an Organic Light-Emitting Diode (OLED), a Quantum Dot Light Emitting Diode (QLED) display panel, etc. Meanwhile, the display panel 10 may be a flat display panel or a curved display panel. It is understood that the types of the display panel 10 includes, but is not limited to, the above examples. When the display panel 10 is an LCD display panel, it may be a Vertical Alignment (VA), a Twisted Nematic (TN), or an In-Plane Switching (IPS) LCD display panel. In the present embodiment, an LCD panel is described as an example.

Figure 2:
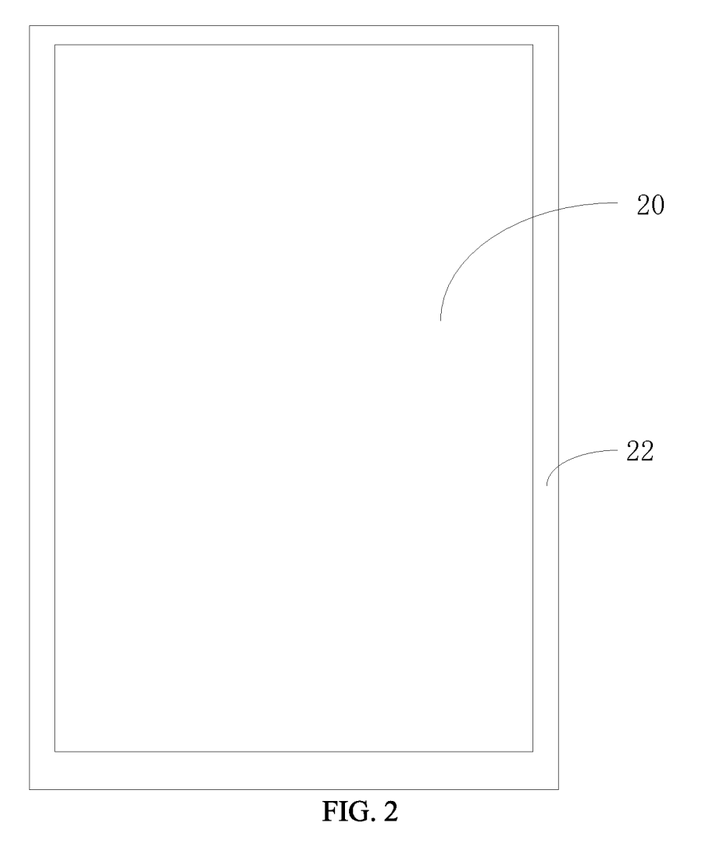
FIG. 2 is a top plan view of a display panel according to an embodiment.

A display panel includes a display area 20 and a non-display area 22, as shown in FIG. 2. The non-display area 22 surrounds the display area 20. The non-display area 22 does not display but serves as a frame area for placing circuits and components such as cameras and logos. The non-display area 22 may surround the display area 20, or may be provided only on one side or three sides of the display area 20, so as to satisfy people's need for a full-screen display.

Figure 3:
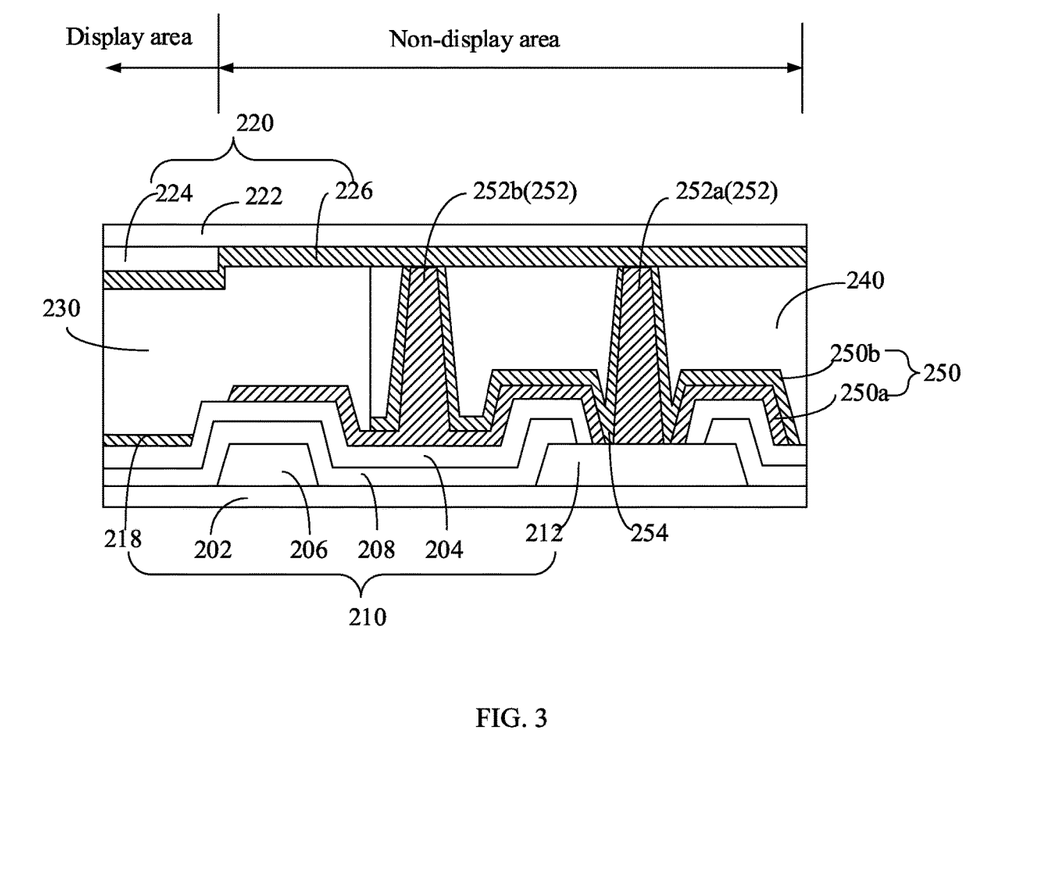
FIG. 3 is a schematic diagram of the display panel of FIG. 2 according to the embodiment.

FIG. 3 is a schematic diagram of a structure of the display panel of FIG. 2. Referring to FIG. 3, the display panel includes a first substrate 210, a second substrate 220, a liquid crystal layer 230, a seal 240, and a multi-function layer 250. In the present embodiment, the second substrate 220 is disposed opposite and spaced apart from the first substrate 210, and may usually be referred to as the upper and the lower substrate, that is, the first substrate 210 is the lower substrate and the second substrate 220 is the upper substrate.

The liquid crystal layer 230 is disposed between the first substrate 210 and the second substrate 220. The seal 240 is disposed between the first substrate 210 and the second substrate 220 and located in the non-display area 22. The seal 240 surrounds the liquid crystal layer 230. The seal 240 is configured to bond between the first substrate 210 and the second substrate 220, and prevent liquid crystal in the liquid crystal layer 230 from overflowing and moisture intrusion, and maintain the peripheral thickness of the display panel. The multi-function layer 250 is disposed on the first substrate 210 and located in the non-display area 22. The multi-function layer 250 includes a support portion 252 embedded in the seal 240 and is in surface contact with the second substrate 220, so that the electrical connection between the first substrate 210 and the second substrate 220 is finally effected. It is understood that in this case, the electrical connection between the first substrate 210 and the second substrate 220 means that the common electrode 212 of the first substrate 210 is connected to the common electrode 226 of the second substrate 220. The multi-function layer 250 is a shading layer, that is, it contains at least one layer of a shading material.

In the foregoing display panel, the multi-function layer 250 is formed on the first substrate 210. The multi-function layer 250 is located in the non-display area 22 and includes the support portion 252 embedded in the seal 240 and is in surface contact with the second substrate 220 to electrically connect the first substrate 210 and the second substrate 220. Since the support portion 252 and the multi-function layer 250 are an integral structure, and the multi-function layer 250 is directly formed on the first substrate 210, that is, the support portion 252 is not independent from the first substrate 210 and the second substrate 220 as the conventional gold ball, the stability thereof is influenced by the first substrate 210 and the second substrate 220, and the stability is favorable. In addition, the multi-function layer 250 is formed on the first substrate 210, the support portion 252 is in surface contact with the first substrate 220 and has a large contact area, the stability is favorable. It is easy to effect the alignment of the first substrate 210 and the second substrate 220, and the peripheral thickness of the display panel can be easily controlled without causing a problem that the peripheral thickness of the display panel is not uniform, the display effect of the panel is hence not affected. And the multi-function layer 250 is a shading layer, it is therefore not necessary to provide a light-shielding layer for the non-display area, which is advantageous to lighting and thinning the display panel.

In one of the embodiments, the first substrate 210 includes an underlay 202, a Thin Film Transistor (TFT) layer, a first passivation layer 204, and a pixel electrode 218. The first passivation layer 204 is formed on the TFT layer. The first passivation layer 204 serves as a protective layer for protecting the TFT layer, such that the metal surface in the TFT layer is converted into a state that is not easily oxidized, and the corrosion rate of the metal is reduced.

The TFT layer includes a gate 206, a gate insulating layer 208, a semiconductor layer (not shown), a source and drain (not shown), and a common electrode 212. The gate 206 is formed on the underlay 202. A common electrode 212 is also formed on the underlay 202. The gate electrode 206 and the common electrode 212 can be obtained during the same manufacturing process, that is, the gate electrode 206 and the common electrode 212 are made of the same material which is conductive material, such as metal. A gate insulating layer 208 is formed on the underlay 202 and covers portions of the gate electrode 206 and the common electrode 212, and exposes portions of the common electrode 212 to facilitate electrical connection of the common electrode 212 with other components. The semiconductor layer is formed on a side of the gate insulating layer 208 away from the gate layer 206. Source and drain are formed on the gate insulating layer 208 and connected to both ends of the semiconductor layer, respectively. In one of the embodiments, the TFT layer also includes a plurality of data lines (not shown). The data line is one of the conductive traces formed in the same horizontal plane with the source and drain electrodes. The data lines are connected to the source to output an external data signal to the source of the corresponding TFT. It is understood that scan lines and power lines are also provided on the TFT layer 210. The scanning line is connected to the gate 206 of the TFT layer. The data line is connected to the source and the drain, thus, the scan line is obtained in the same fabricating process as the gate, on the same horizontal plane; The data lines and the source and drain are obtained in the same fabricating process and are in the same horizontal plane. The scan lines and the data lines intersect to form pixel regions disposed in an array.

In one of the embodiments, the underlay 202 may be made of a material known in the art, such as glass or plastic. The material of the gate 206 may be one or more of a metal conductive material, such as aluminum, copper, etc. In other embodiments, other conductive materials may also be used for the gate 206. The material of the gate insulating layer 208 may be silicon nitride or silicon oxide or a combination thereof. It will be appreciated that the gate insulating layer 208 may also be of other materials known to those skilled in the art. In one of the embodiments, the semiconductor layer includes an amorphous silicon layer and an N+ type doped amorphous silicon layer (not shown). The amorphous silicon layer and the N+ type doped amorphous silicon layer are sequentially laminated on the gate insulating layer 208. Amorphous silicon (a-Si) is a form of monatomic silicon. The amorphous silicon does not have a complete diamond unit cell and is not of high purity, yet its melting point, density and hardness are significantly lower than that of crystalline silicon. The amorphous silicon layer (a-si layer) serves as an active layer, which may be formed through Plasma Enhanced Chemical Vapor Deposition (PECVD) by continuous deposition. The N+ type doped amorphous silicon layer is formed above the amorphous silicon layer. In the present embodiment, the N+ type doped amorphous silicon layer is formed through PECVD by continuous deposition. The source and drain are prepared by the same metal layer. The source and drain may be made of a conductive material such as aluminum, copper, molybdenum, etc. The first passivation layer 204 serves as a protective layer for protecting the TFT layer so as to convert the metal surface in the TFT layer into a state that is not easily oxidized, and to delay the corrosion rate of the metal. The first passivation layer 204 may be of PV insulating material.

A pixel electrode 218 is formed on the first passivation layer 204. The TFT layer 110 may employ a TFT layer structure commonly used in the art, and it is known to those skilled in the art that the pixel electrode 218 is connected to the drain in the TFT layer 110.

In one of the embodiments, the multi-function layer 250 includes a support layer 250a and a conductive layer 250b. The support layer 250a is formed over the first passivation layer 204 in the first substrate 210 and located at the non-display area 22. The support layer 250a includes the support portion 252. The support layer 250a defines a first via 254 located above the common electrode 212 of the first substrate 210. The conductive layer 250b is formed on the support layer 250a. The conductive layer 250b is electrically connected to the common electrode 212 in the first substrate 210 through the first via 254. A region of the conductive layer 250a located on the support portion 252 is connected to the second substrate 220, thereby effecting electrical connection between the first substrate 210 and the second substrate 220. The size of the first via 254 is generally defined by the thickness of the layer to be drilled, and is typically 5 μm to 30 μm.

In one of the embodiments, the number of support portions 252 in the multi-function layer 250 is plural. The plurality of support portions 252 include a first support portion 252a and a second support portion 252b. The first support portion 252a is formed in the first region located above the common electrode 212 of the first substrate 210. The second support portion 252b is formed in the second region. The second region may be an area in the non-display area or the area covered by the seal 240 and other than the first region. At this time, the first vias 254 are formed on both sides of the first support portion 252a. The conductive layer 250b is electrically connected to the common electrode 212 of the first substrate 210 through the first via 254, and is connected to the second substrate 220 on the end surfaces of the first support portion 252a and the second support portion 251b near the second substrate 220. In one of the embodiments, the end surfaces of the support portions 252 near the second substrate 220 are all located in the first plane. The first plane is parallel to the surface of the second substrate 220, thereby ensuring a surface contact between the support portion 252 and the second substrate 220 rather than a conventional point contact, so as to provide a better support function. In one of the embodiments, the total area of the support portions 252 in contact with the second substrate 220 is 1% to 5% of the area of the non-display area 22, and the entire multi-function layer 250 has a favorable supporting function.

Figure 4:
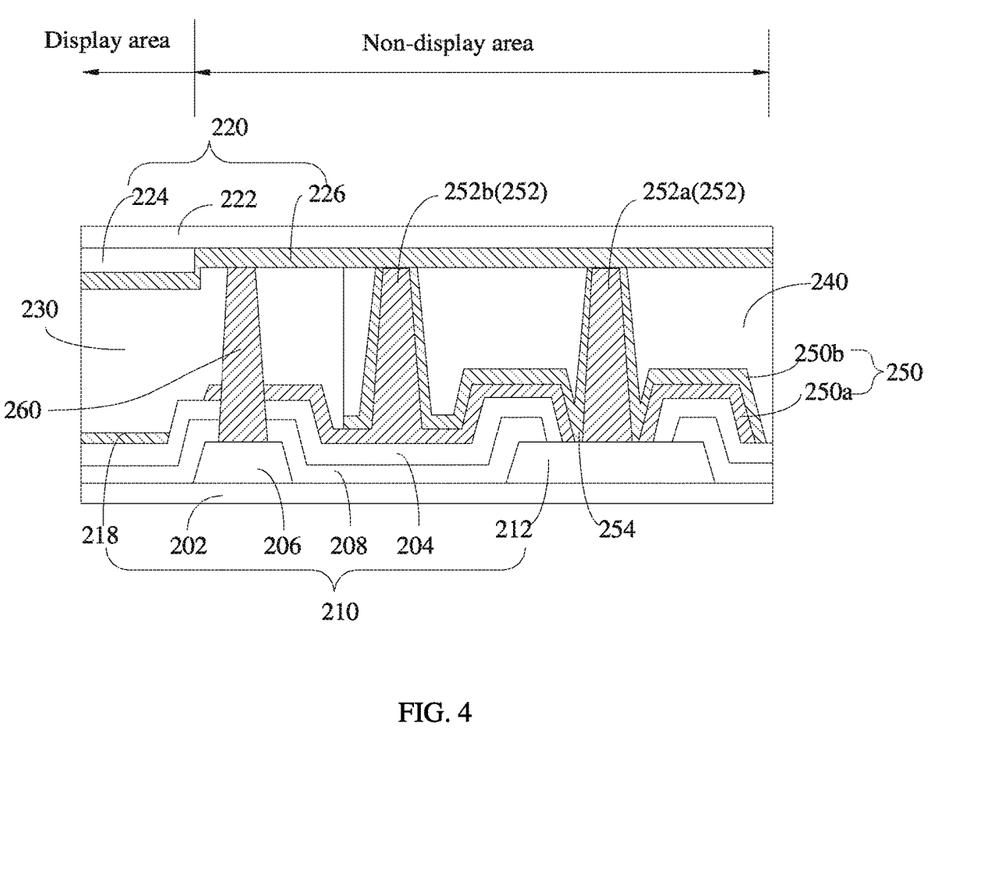
FIG. 4 is another schematic diagram of the display panel of FIG. 2 according to the embodiment.

In one of the embodiments, the support layer 250a covers the entire non-display area 22 and is a shading layer. The support layer 250a may be a film formed of black organic paste such as a black matrix. In one of the embodiments, the first substrate 210 further includes a support member 260 formed on the gate of the TFT layer (see FIG. 4). The support member 260 and the support portion 252 have the same structure, that is, both have the same size and shape. The support member 260 and the support portion 252 can be obtained in the same preparation process, so that one process can be saved and the difficulty of product preparation can be reduced. The support member 260 can provide support, but cannot provide an electrical connection like the support portion 252. In one of the embodiments, both the materials of the support member 260 and the support layer 250a are a shading material, such as a Black Matrix (BM), to form the shading layer of the first substrate 210. At this time, the second substrate 220 is not provided with the shading layer (BM layer). Referring to FIG. 3, the second substrate 220 includes an underlay 222, a color filter layer 224 formed on the underlay 222, and a common electrode 226 formed on the color filter layer 224 and the underlay 222. In the present embodiment, the color filter layer 224 may be a color block. The type of the color block may be determined according to the pixel design. For example, when a pixel structure including a red sub-pixel (R sub-pixel), a blue sub-pixel (B sub-pixel) and a green sub-pixel (G sub-pixel) is employed, the color block includes a red color block, a blue color block, and a green color block. When other pixel structures are used, the type of the color block is changed, and is not limited to a specific composition. The multi-function layer 250 serves as a shading layer while effecting support and conductive connection, so that the peripheral thickness can be controlled more accurately when the first substrate 210 and the second substrate 220 are aligned.

In one of the embodiments, the conductive layer 250b in the multi-function layer 250, the pixel electrode 212 of the first substrate 210, and the common electrode 226 of the second substrate 220 are all made of the same conductive material, such as Indium Tin Oxide (ITO). In one of the embodiments, the conductive layer 250b is obtained in the same preparation process step as the pixel electrode 212 in the first substrate 210. That is, at this time, after forming the first passivation layer 204 on the first substrate 210, preparation of the support layer 250a is performed, thereafter, a conductive material such as ITO having a uniform thickness is deposited on the entire surface of the first substrate 210, and then the conductive layers 250b of the pixel electrode 212 and the multi-function layer 250 are respectively formed by, for example, etching. The conductive layer 250b enables electrical connection between the common electrode 226 of the second substrate 220 and the common electrode 218 of the first substrate 210.

In one of the embodiments, the structure of the support portion 252 may be configured as needed to the extent it can provide the supporting function and is in surface contact with the second substrate 220. Specifically, the shape of the cross-section of the support portion 252 may be circular, elliptical, rectangular, or other shapes. In this disclosure, the cross-sections refer to planes parallel to the surface of the second substrate 220. Further, the shape of the cross-section of the support portion 252 is a symmetrical pattern, and the support portions are regularly disposed in the non-display area 22 to better control the uniformity of the peripheral thickness. The shape of the support portion 252 may suffice the supporting and ensure the electrical connection between the conductive layer 250b and the first substrate 210 and the second substrate 220. In one of the embodiments, an edge contacting the second substrate 220 in a longitudinal section of the support portion 252 is referred to as an upper bottom, and an edge contacting the first substrate 210 is referred to as a lower bottom. The width of the upper bottom may range from 10 μm to 20 μm, while the width of the lower bottom may range from 20 μm to 30 μm. The widths of the upper bottom and lower bottom are not required to be strictly specified, rather it may be adjusted according to the actual product size. In one of the embodiments, when the supporting layer 250a also serves as the shading layer, the thickness of the region with no support portion 252 formed is the same as the thickness of the conventional shading layer, which is 1 μm to 1.5 μm. Further, the support portion 252 may be a solid structure so as to have a better supporting effect.

An embodiment of the present disclosure also provides a display terminal, including a terminal body and a display panel as described in any of the foregoing embodiments. The display terminal may be, for example, a mobile phone, a personal digital assistant (PDA), a digital camera, a computer screen or a notebook computer screen, etc.

The foregoing respective technical features involved in the respective embodiments can be combined arbitrarily, for brevity, not all possible combinations of the respective technical features in the foregoing embodiments are described, however, to the extent they have no collision with each other, the combination of the respective technical features shall be considered to be within the scope of the description.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A display panel, comprising a display area and a non-display area surrounding the display area, the display panel comprising:
a first substrate;
a second substrate disposed opposite and spaced apart from the first substrate;
a seal disposed between the first substrate and the second substrate and located in the non-display area; and
a multi-function layer disposed on the first substrate and located in the non-display area, wherein the multi-function layer comprises a support portion embedded in the seal and is in surface contact with the second substrate, and the multi-function layer is a light blocking layer;
wherein the first substrate comprises:
an underlay;
a Thin Film Transistor (TFT) layer formed on the underlay and comprises the common electrode;
a first passivation layer formed on the TFT layer and away from the underlay; and
a pixel electrode formed on the first passivation layer and located in the display area;
wherein the conductive layer is connected to the common electrode of the first substrate through the first via; and the pixel electrode and the common electrode have the same thickness; and
wherein the first substrate further comprises a support member formed on a gate of the TFT layer, the support portion and the support member have the same structure and are obtained in the same preparation process, and both the support member and the support layer are made of a shading material.

2. The display panel according to claim 1, wherein the multi-function layer comprises:
a support layer formed on the first substrate, the support layer comprising the support portion, the support layer defining a first via located above a common electrode of the first substrate; and
a conductive layer formed on the support layer, a region of the conductive layer located on the support portion being electrically connected to the second substrate, and the conductive layer being also electrically connected to the first substrate through the first via.

3. The display panel according to claim 2, wherein a pore size of the first via is from 5 μm to 30 μm.

4. The display panel according to claim 2, wherein the number of the support portions is plural, the plurality of the support portions are disposed in the non-display area and spaced apart from each other, ends of each of the support portions proximately to the second substrate are located in a first plane; the first plane is parallel to a surface of the second substrate.

5. The display panel according to claim 2, wherein a total area of the support portion in contact with the second substrate is 1% to 5% of the non-display area.

6. The display panel according to claim 2, wherein the support portion comprises:
a first support portion formed in a first region located above the common electrode of the first substrate; and
a second support portion located in a second region of the first substrate.

7. The display panel according to claim 1, wherein both the support member and the support layer are black matrixes.

8. The display panel according to claim 1, wherein the first passivation layer is a photovoltaic (PV) insulating material.

9. The display panel according to claim 1, wherein both the conductive layer and the pixel electrode are made of indium tin oxide.

10. The display panel according to claim 1, wherein the support portions are regularly disposed in the non-display area.

11. The display panel according to claim 1, wherein a shape of a cross-section of the support portion is a symmetrical pattern.

12. The display panel according to claim 11, wherein the shape of the cross-section of the support portion is circular, elliptical or rectangular.

13. The display panel according to claim 1, further comprising a liquid crystal layer formed between the first substrate and the second substrate.

14. The display panel according to claim 1, wherein the display panel is a Liquid Crystal Display (LCD) panel, an Organic Light-Emitting Diode (OLED) display panel, or a Quantum Dot Light-Emitting Diode (QLED) display panel.

15. A display panel comprising a display area and a non-display area surrounding the display area, the display panel comprises:
a first substrate;
a second substrate disposed opposite and spaced apart from the first substrate;
a liquid crystal layer disposed between the first substrate and the second substrate;
a seal disposed between the first substrate and the second substrate and located in the non-display area; wherein the seal surrounds the liquid crystal layer; and
a multi-function layer disposed on the first substrate and located in the non-display area, wherein the multi-function layer comprises a support portion embedded in the seal and is in surface contact with the second substrate so as to effect an electrical connection between the first substrate and the second substrate;
wherein the multi-function layer comprises a support layer formed on the first substrate, the support layer comprises the support portion, the support layer defines a first via located above a common electrode of the first substrate; and a conductive layer formed on the support layer, a region of the conductive layer located on the support portion is electrically connected to the second substrate, and the conductive layer is also electrically connected to the first substrate through the first via; the support layer is a shading layer; a total area of the support portion in contact with the second substrate is 1% to 5% of the non-display area;
wherein the first substrate comprises:
an underlay;
a TFT layer formed on the underlay and comprises the common electrode;
a first passivation layer formed on the TFT layer and away from the underlay; and
a pixel electrode formed on the first passivation layer and located in the display area;

wherein the conductive layer is connected to the common electrode of the first substrate through the first via; and the pixel electrode and the common electrode have the same thickness; and wherein the first substrate further comprises a support member formed on a gate of the TFT layer, the support portion and the support member have the same structure and are obtained in the same preparation process, and both the support member and the support layer are made of a shading material.

16. A display terminal, comprising a terminal body and a display panel disposed thereon the terminal body; the display panel comprising a display area and a non-display area surrounding the display area, the display panel further comprising:

a first substrate;

a second substrate disposed opposite and spaced apart from the first substrate;

a seal disposed between the first substrate and the second substrate and located in the non-display area; and a multi-function layer disposed on the first substrate and located in the non-display area, wherein the multi-function layer comprises a support portion embedded in the seal and is in surface contact with the second substrate, and the multi-function layer is a light blocking layer;

wherein the first substrate comprises:

an underlay;

a Thin Film Transistor (TFT) layer formed on the underlay and comprises the common electrode;

a first passivation layer formed on the TFT layer and away from the underlay; and a pixel electrode formed on the first passivation layer and located in the display area;

wherein the conductive layer is connected to the common electrode of the first substrate through the first via; and the pixel electrode and the common electrode have the same thickness; and wherein the first substrate further comprises a support member formed on a gate of the TFT layer, the support portion and the support member have the same structure and are obtained in the same preparation process, and both the support member and the support layer are made of a shading material.

\* \* \* \* \*